US012754513B2

(12) United States Patent
Fernandez et al.

(10) Patent No.: US 12,754,513 B2
(45) Date of Patent: Oct. 6, 2026

(54) CONTROL MEMBER FOR CONTROLLING AT LEAST ONE FUNCTION OF A TIMEPIECE MOVEMENT

(71) Applicant: Manufacture d'Horlogerie Audemars Piguet SA, Le Brassus (CH)

(72) Inventors: José-Manuel Fernandez, Le Brassus (CH); Cédric Chague, Miserey-Salines (FR)

(73) Assignee: MANUFACTURE D'HORLOGERIE AUDEMARS PIGUET SA, Le Brassus (CH)

( * ) Notice: Subject to any disclaimer, the term of this patent is extended or adjusted under 35 U.S.C. 154(b) by 194 days.

(21) Appl. No.: 18/854,383

(22) PCT Filed: Apr. 17, 2023

(86) PCT No.: PCT/EP2023/059902

§ 371 (c)(1),
(2) Date: Oct. 4, 2024

(87) PCT Pub. No.: WO2023/202977

PCT Pub. Date: Oct. 26, 2023

(65) Prior Publication Data

US 2026/0252030 A1 Aug. 27, 2026

(30) Foreign Application Priority Data

Apr. 21, 2022 (EP) .................................... 22169142

(51) Int. Cl.
*G04B 3/04* (2006.01)
*G04B 19/24* (2006.01)
*G04F 7/00* (2006.01)

(52) U.S. Cl.
CPC ............ *G04B 3/048* (2013.01); *G04B 19/24* (2013.01); *G04F 7/00* (2013.01)

(58) Field of Classification Search
CPC ........... G04F 7/00; G04B 19/24; G04B 3/048; G04B 3/04
See application file for complete search history.

(56) References Cited

U.S. PATENT DOCUMENTS

| | | | | |
|---|---|---|---|---|
| 750,619 A * | 1/1904 | Ditesheim ............. | G04B 27/04 368/193 |
| 2,919,537 A * | 1/1960 | Meyer ................. | G04B 37/103 368/193 |

(Continued)

FOREIGN PATENT DOCUMENTS

| | | |
|---|---|---|
| CH | 703455 A1 | 1/2012 |
| JP | 2015230270 A | 12/2015 |

(Continued)

OTHER PUBLICATIONS

International Search Report and Written Opinion of the ISA for PCT/EP2023/059902 mailed Jul. 19, 2023, 13 pages.

*Primary Examiner* — Sean Kayes
(74) *Attorney, Agent, or Firm* — NIXON & VANDERHYE

(57) ABSTRACT

A control member for controlling a function of a timepiece movement includes a crown including a head and a central rod rigidly connected to a control rod, and a guide tube, having a longitudinal axis. The central rod is rotatable axially. The crown can rotate between a stable neutral angular position and an unstable angular actuation position in which the first function can be actuated via the control rod. An automatic bringing-back device brings the crown from the actuation to the neutral position. First and second tubular cams cooperate with a spring in the guide tube. By cooperation of tubular cam working surfaces, crown rotation into its actuation position axially translates the second cam, compressing the spring. Axial translation of the second cam returned by the spring results axially rotates the first cam, (Continued)

which automatically returns the crown to its neutral position. Also disclosed is a related timepiece.

20 Claims, 3 Drawing Sheets

(56) References Cited

U.S. PATENT DOCUMENTS

| | | | | | |
|---|---|---|---|---|---|
| 3,874,162 | A * | 4/1975 | Boxberger | G04C 3/001 968/447 |
| 4,419,018 | A * | 12/1983 | Meyrat | G04G 5/027 368/321 |
| 4,452,537 | A * | 6/1984 | Fukuda | G04B 23/021 368/269 |
| 7,255,473 | B2 * | 8/2007 | Hiranuma | G04B 3/043 368/308 |
| 11,016,447 | B2 * | 5/2021 | Zanesco | G04G 21/00 |

FOREIGN PATENT DOCUMENTS

| | | | |
|---|---|---|---|
| JP | 2017032286 | A | 2/2017 |
| WO | 2022175002 | A1 | 8/2022 |

* cited by examiner

CONTROL MEMBER FOR CONTROLLING AT LEAST ONE FUNCTION OF A TIMEPIECE MOVEMENT

This application is the U.S. national phase of International Application No. PCT/EP2023/059902 filed Apr. 17, 2023 which designated the U.S. and claims priority to EP 22169142.1 filed Apr. 21, 2022, the entire contents of each of which are hereby incorporated by reference.

BACKGROUND OF THE INVENTION

Field of the Invention

The present invention relates to a control member for controlling at least one first function of a timepiece movement, said control member comprising a crown comprising a head and a central rod rigidly connected to the head and intended to be rigidly connected to a control rod, and a guide tube, having a longitudinal axis A, in which said central rod is mounted such that it can at least rotate axially according to said axis A, the crown being arranged to occupy at least one non-pressed position in which said crown can rotate axially in at least one direction between at least one stable neutral angular position and at least one unstable angular actuation position in which said first function can be actuated via the control rod.

The present invention also relates to a timepiece comprising at least one such control member.

Description of the Related Art

Such a control member is used, for example, in a timepiece described in application WO 2022/175002 filed by the applicant, said timepiece comprising in particular a month indicating mechanism, the first function being a correction function for the month. To actuate the correction function for the month, the control member, in the non-pressed position, can rotate axially, for example through an angle of approximately 60°, in one direction between its central stable angular position and a first unstable angular actuation position, corresponding to a rapid correction of the month+1, and through an angle of approximately 60° in the other direction between its central stable angular position and a second unstable angular actuation position corresponding to a rapid correction of the month−1.

The timepiece described in application WO 2022/175002 also comprises a chronograph mechanism, the control member also being arranged, in response to a pressure, such that it can translate axially between its non-pressed position and a pressed position in which a second function is actuated, namely one of the chronograph functions and, more particularly, the Zero-Resetting or Flyback function. The control member automatically resumes its non-pressed position following release of the pressure on the control member, like a push-button.

During the correction of the month, the return to the central stable angular position of the control member is ensured by a mechanism comprising a cam-heart-piece kinematically linked to the control member and returned to its central position by a spring once the torque applied to the control member is released and the correction is made.

However, this mechanism is not always sufficiently effective to guarantee an automatic bringing of the control member back from one of its unstable correction positions to its stable central position.

The present invention aims to remedy this drawback by proposing a control member which makes it possible to guarantee that it is automatically brought back to a neutral position after having been pivoted into an unstable position in order to actuate a function of a timepiece movement, such as a rapid correction.

Another object of the present invention is to propose a single control member which makes it possible to rapidly control a first function by rotating the control member with an automatic bringing back to the neutral position, like a rapid control rod, and which also makes it possible to actuate a second function, which is different from the first function, by pressing on said control member with an automatic bringing back to the non-pressed position, in the manner of a push-button.

SUMMARY OF THE INVENTION

To this end, the invention relates to a control member for controlling at least one function of a timepiece movement, said control member comprising a crown comprising a head and a central rod rigidly connected to the head and intended to be rigidly connected to a control rod, and a guide tube, having a longitudinal axis A, in which said central rod is mounted such that it can at least rotate axially according to said longitudinal axis A, the crown being arranged to occupy at least one non-pressed position in which said crown can rotate axially in at least one direction between at least one stable neutral angular position and at least one unstable angular actuation position in which said first function can be actuated via the control rod.

According to the invention, the control member comprises an automatic bringing-back device for automatically bringing the crown from its actuation position back to its neutral position, comprising a first tubular cam mounted around the central rod such that it is rigidly connected thereto, and a second tubular cam which is housed inside the guide tube, and is mounted such that it can freely translate axially on the central rod and arranged so as to be able to essentially slide axially within said guide tube and to cooperate with a spring provided in the guide tube, said first and second cams having working surfaces arranged to be in contact at least when the crown is in its neutral position, said working surfaces having a profile obtained by having at least one plane inclined on the axis A intersect said first and second cams, such that, by the cooperation of the working surfaces, an axial rotation of the first cam via a rotation of the crown into its actuation position results in an axial translation of the second cam, compressing the spring, and such that, by the cooperation of the working surfaces, an axial translation of the second cam returned by the spring, when the rotation into the actuation position ceases, results in an axial rotation of the first cam, which automatically returns the crown to its neutral position.

Thus, the invention makes it possible to guarantee the automatic bringing back of the crown to its neutral position after having performed a rapid control of a first function.

In a preferred embodiment, the central rod is also mounted such that it can translate axially in the guide tube, the crown also being arranged, in response to a pressure on said crown, such that it can translate axially between its non-pressed position and a pressed position in which a second function which is distinct from the first function can be actuated via the control rod, such that, by the cooperation of the working surfaces, an axial translation of the first cam results in an axial translation of the second cam, compressing the spring, and, by the cooperation of the working surfaces, in order to resume its non-pressed position, when the pressure on the crown ceases, an axial translation of the second cam returned by the spring, resulting in an axial translation of the first cam, which returns the crown to its non-pressed position.

Thus, the invention makes it possible to control two different functions such as two functions of different complications, which are independent of one another, by means of a single control member, one of the functions being controlled by said control member in the non-pressed position, like a rapid control rod, and the other of the functions being controlled by said control member in the pressed position like a push-button.

According to a preferred embodiment, the first function is the correction of the month of a month indicating mechanism and the second function is the Zero-Resetting or Flyback function of a chronograph mechanism.

The present invention also relates to a timepiece comprising at least one control member as described above.

BRIEF DESCRIPTION OF THE DRAWINGS

Other characteristics and advantages of the present invention will appear on reading the following detailed description of an embodiment of the invention, which is provided by way of a non-limiting example, and with reference to the appended drawings, wherein.

DETAILED DESCRIPTION

Figure 1:
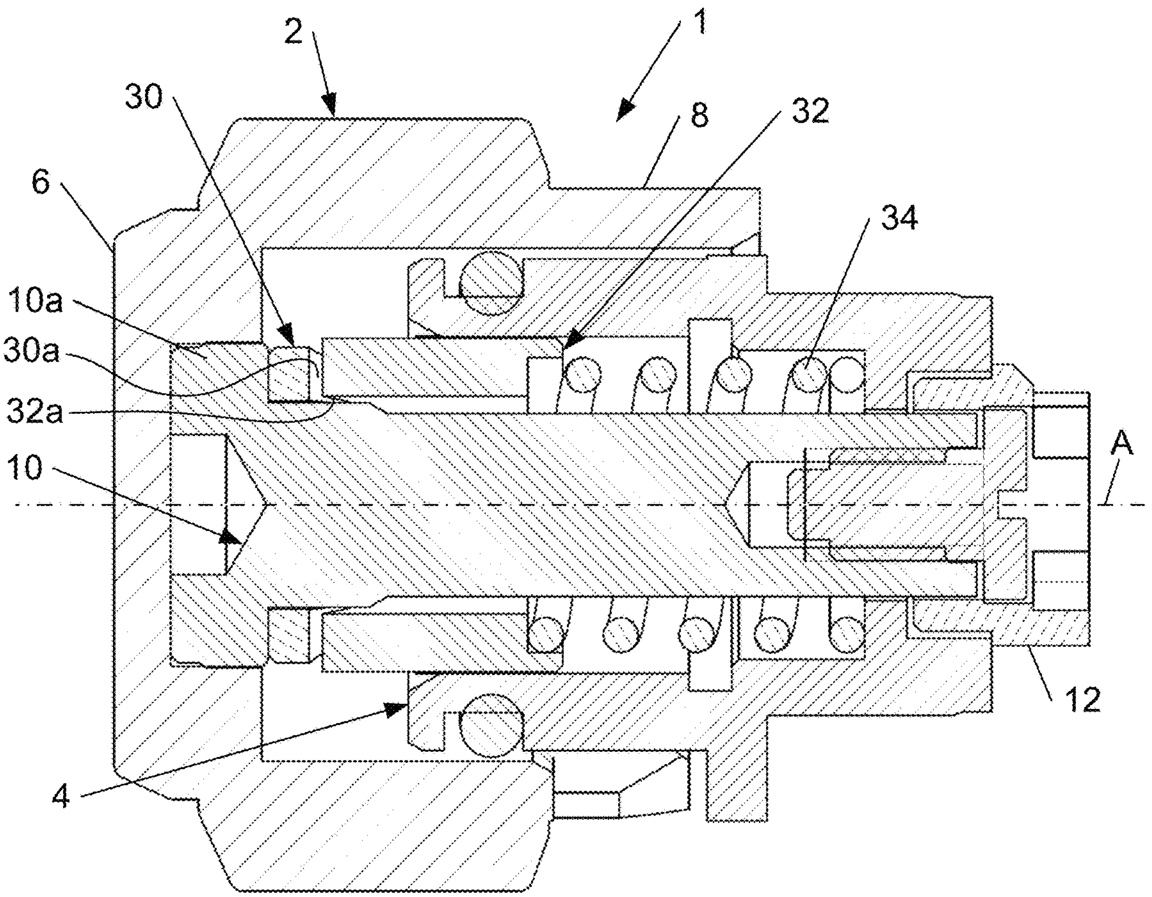
FIG. 1 is a sectional view of the control member according to the invention, the crown of said control member being in the non-pressed and neutral position.
Figure 2:
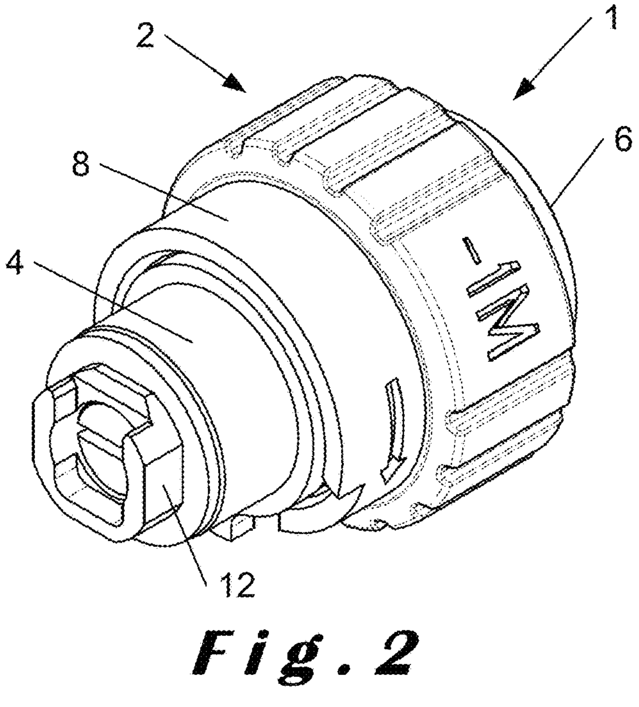
FIG. 2 is an isometric view of the control member according to the invention.
Figure 3:
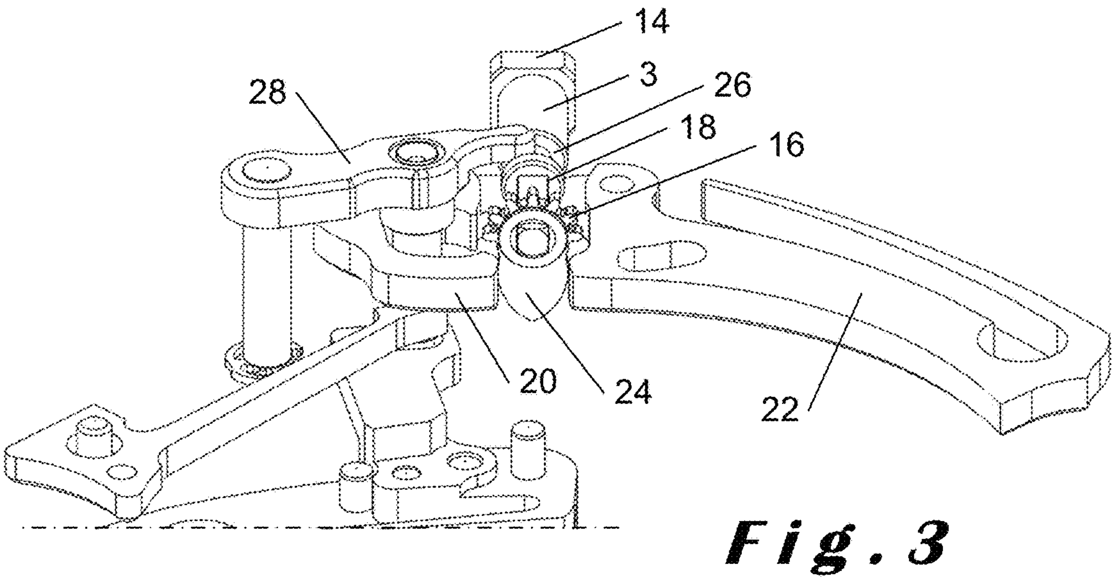
FIG. 3 is a schematic view of a control rod which can be rigidly connected to the control member of the present invention, arranged to control a Zero-Resetting or Flyback function of a chronograph mechanism and a correction function for the month of a month indicating mechanism, of a timepiece, the control member being in its non-pressed and neutral position.

With reference to FIGS. 1 to 3, the present invention relates to a control member 1 for controlling at least one and, advantageously, several different functions of a timepiece movement, said control member 1 comprising a crown 2 intended to be rigidly connected to a control rod 3 arranged to actuate said functions. The control member 1 is mounted on the middle (not shown) of a watch case of a timepiece such that said crown 2 protrudes from said middle. To this end, the control member 1 comprises a guide tube 4 intended to be fixed by screwing or driving in the middle. Preferably, the guide tube 4 can generally have a symmetry of revolution with respect to a longitudinal axis A constituting the axis of rotation, and also preferably the axis of translation, of the crown 2.

The crown 2 is arranged to occupy a non-pressed or rest position shown in FIG. 1, in which said crown 2 can rotate axially in at least one direction between at least one stable neutral angular position and at least one unstable angular actuation position in which a first function can be actuated via the control rod 3, said first function being, for example, a rapid correction function of a mechanism, the at least one unstable angular actuation position typically corresponding to a correction position of the mechanism.

The crown 2 is advantageously arranged such that it can rotate axially in one direction between the stable neutral angular position, defining a stable, preferably central, angular position and a first unstable angular actuation position, and such that it can rotate axially in the other direction between said neutral position and a second unstable angular actuation position. When the first function is a correction function of a mechanism, the first unstable angular actuation position typically corresponds to a first correction position of the mechanism, and the second unstable angular actuation position typically corresponds to a second correction position of the mechanism.

The crown 2 can advantageously rotate axially through an angle less than 360°, preferably less than 180° and, more preferably, less than or equal to 70° in each direction of rotation.

Furthermore, in a preferred embodiment, the crown 2 is also arranged, in response to a pressure on said crown 2, such that it can translate axially between its non-pressed or rest position shown in FIG. 1 and a pressed position in which a second function which is distinct from the first function, for example a function of a chronograph mechanism, can be actuated via the control rod 3, and to resume its non-pressed or rest position when the pressure on the crown 2 ceases. In the present description, the "rest position" or "non-pressed position" is defined with respect to the movement in axial translation of the crown 2, the rest or non-pressed position then being defined as a position which the crown assumes when it is not subjected to an axial force or pressure, in which the first function can be actuated, the rest or non-pressed position designating the state in which the crown is located when it is not subjected to any force external to the middle.

The crown 2 has a head 6, an axial skirt 8 rigidly connected to the head 6 and a central rod 10 connected to the head 6 or rigidly connected to the latter. The assembly formed by the crown 2 and the central rod 10 has a symmetry of revolution around the axis A. The central rod 10 is mounted such that it can rotate axially, and preferably translate axially, according to said longitudinal axis A in the guide tube 4. The head 6 and the skirt 8 are mounted such that they can rotate, and preferably translate, around the guide tube 4 according to the axis A.

The central rod 10 is intended to be rigidly connected to the control rod 3 by means of, for example, a female driving square 12 fixed to the free end of the central rod 10 by screwing and in which it is intended to fit a male square 14 (cf. FIG. 3) provided at the end of the control rod 3. During the assembly of the movement in the case, the square end of the control rod 3 is slid into the female driving square 12 through its open face. Once fitted, the female square 12 of the crown 2 permanently rotates the male square of the control rod 3. Furthermore, in the preferred embodiment in which the crown 2 also functions like a push-button, the back of the driving square 12 can push the end of the control rod 3 in axial translation into the pressed position when a pressure is exerted on the crown 2. The control rod 3 has its own return spring which maintains its square end in the driving square 12 in order to return the control rod 3 to the rest position when the pressure ceases. It is obvious that the driving of the control rod by a square can be replaced by a drive having another suitable shape, such as a triangle, two flat parts or another polygonal shape.

Thus, the crown 2, with the central rod 10, and the control rod 3 once mounted on the central rod 10, are always rigidly connected in movement (in rotation and in translation). They can be turned around the axis A like a control rod and, in the preferred embodiment in which the crown 2 also functions like a push-button, they can be moved in axial translation according to the axis A into a pressed position by a user in order to control two different functions of the timepiece and, more precisely, functions of two different complications, as will be described in more detail below.

More particularly, the timepiece comprises a first complication, the first function being linked to this first complication and being able, for example, to be a rapid correction function of a mechanism, the unstable angular actuation position(s) corresponding to one or more correction position(s) of the mechanism. For example, the timepiece can comprise a month indicating mechanism or a chronograph mechanism, the first function being a correction function for the month, or respectively at least one function of the chronograph such as the START/STOP function, the Zero-Resetting or Flyback function, preferably the Zero-Resetting or Flyback function. It is obvious that any other complication which could be corrected by a rapid rotation of the crown 2, such as a moon, can be used.

The timepiece can comprise a second complication such as a chronograph mechanism, and the second function is one of the chronograph functions such as the START/STOP function, the Zero-Resetting or Flyback function. It is obvious that any other complication which could be corrected by a pressure on the crown 2, such as the day or the week, can be used.

For example, the timepiece can comprise a month indicating mechanism and a chronograph mechanism, the first function being a correction function for the month, the second function being one of the chronograph functions, preferably the Zero-Resetting or Flyback function.

Any other suitable complication can be used.

In order to be able to control a first function via the control rod 3 by a rotation of the crown 2, and preferably a second function via said control rod 3 by a pressure on the crown 2, the control rod 3 is arranged to be rigidly connected in rotation to a first actuating device of the first function, and to preferably be arranged to cooperate with a second actuating device of the second function during the movement of the crown 2 into its pressed position, while freely translating axially with respect to the first actuating device.

Details of such a control rod 3 are provided in application WO 2022/175002. For this reason, it will simply be described here that the first actuating device comprises an intermediate wheel 16 mounted on the square 18 of the control rod 3 in order to be rigidly connected in rotation to said control rod 3 and to preferably be able to only slide one with respect to the other, said intermediate wheel 16 being arranged to actuate the first function, for example the correction function for the month of a month indicating mechanism. The intermediate wheel 16 moves about, like the crown 2 and the control rod 3, between three angular positions, namely a first neutral position, a first unstable angular rapid correction position, for example at +65° with respect to the neutral position, corresponding to the addition of a month and a second unstable angular rapid correction position, for example at −65° with respect to the neutral position, corresponding to the removal of a month. In the example shown, the first actuating device also comprises a centering lever 20 of the control rod 3 and a centering spring 22 of the control rod 3, arranged to act on a heart-piece 24 linked to the intermediate wheel 16, in order to reposition, in particular, the control rod 3 in the central position.

The control rod 3 also advantageously has a groove 26 and the second actuating device comprises a pull-out piece 28 pivotally mounted on an element of the frame, engaged in said groove 26 and arranged to actuate the second function, for example the Zero-Resetting function of a chronograph mechanism, during a pressure on the crown 2, resulting in an axial translation of the control rod 3.

In the example shown, during a rapid rotation of the crown 2, and therefore of the control rod 3, the spring 22 and the centering lever 20 act on the heart-piece 24. As soon as the torque transmitted to the control rod 3 is released, the spring 22 and the centering lever 20 act on the walls of the heart-piece 24 in order to reposition it, with the control rod 3 in particular, and to therefore reposition the crown 2 in its stable central neutral angular position.

In accordance with the invention, the control member 1 comprises its own automatic bringing-back device for automatically bringing the crown 2 from one of its unstable actuation positions back to its stable neutral position.

In the example shown, the automatic bringing-back to the stable position device integrated into the control member according to the invention is used to reinforce the automatic bringing-back device of the control rod 3. However, it is obvious that the automatic bringing-back to the stable position device integrated into the control member according to the invention can be provided alone, without any return device or equivalent being provided in particular on the control rod.

Said automatic bringing-back device of the control member 1 comprises a first tubular cam 30 mounted around the central rod 10 such that it is rigidly connected thereto on the side of the base 10*a* of said central rod 10 rigidly connected to the head 6 of the crown 2, such that the first cam 30 turns with the central rod 10 according to the axis A when the crown 2, in its non-pressed position, is turned in one direction or in the other. In the preferred embodiment in which the crown 2 also functions like a push-button, the first cam 30 is also moved in translation according to the axis A with the central rod 10 when a pressure is exerted on the crown 2.

The automatic bringing-back device also comprises a second tubular cam 32 which is housed inside the guide tube 4, mounted such that it can freely translate axially on the central rod 10 and arranged to be able to essentially, or indeed solely, slide axially within said guide tube 4 while being guided mainly in axial translation in said guide tube 4, its rotation with respect to said guide tube 4 being minimal, if not impossible, and to cooperate with a spring 34 provided in the guide tube 4, wound around the central rod 10 between the back of the guide tube 4 and the second cam 32.

Figure 4:
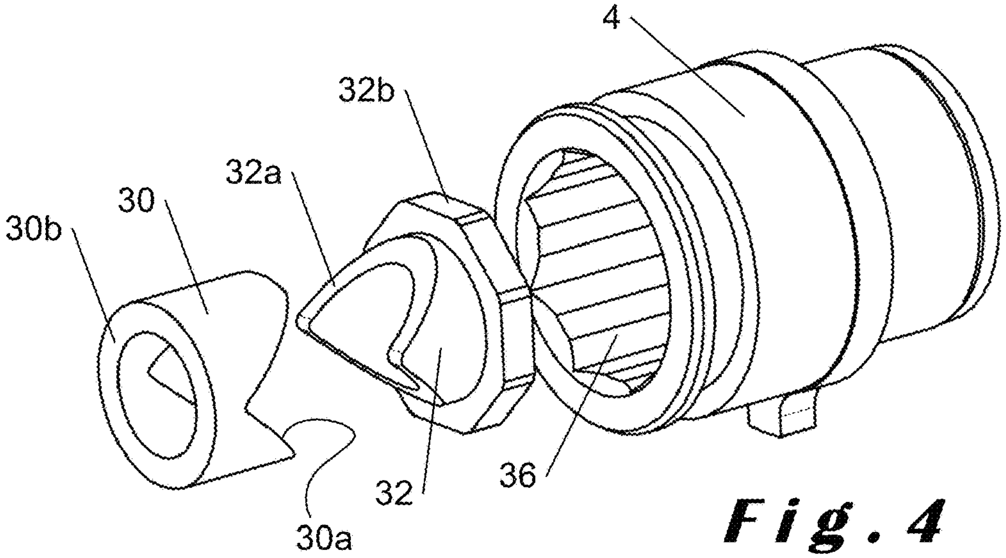
FIG. 4 is an isometric view of the automatic bringing-back device according to the invention.
Figure 5:
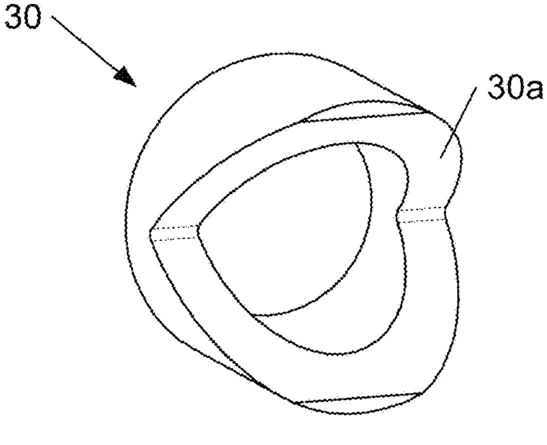
FIG. 5 is an isometric view of the first female cam of FIG. 4.
Figure 6:
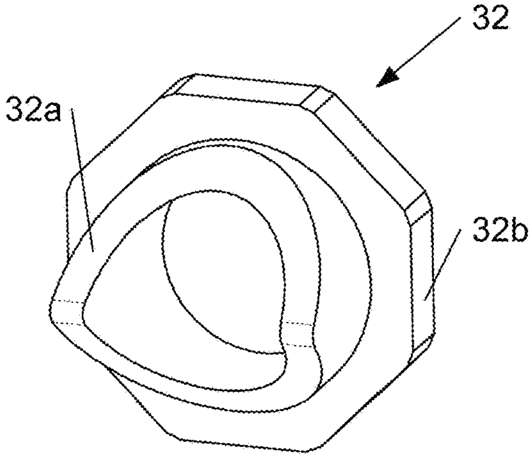
FIG. 6 is an isometric view of the second male cam of FIG. 4.
Figure 7A:
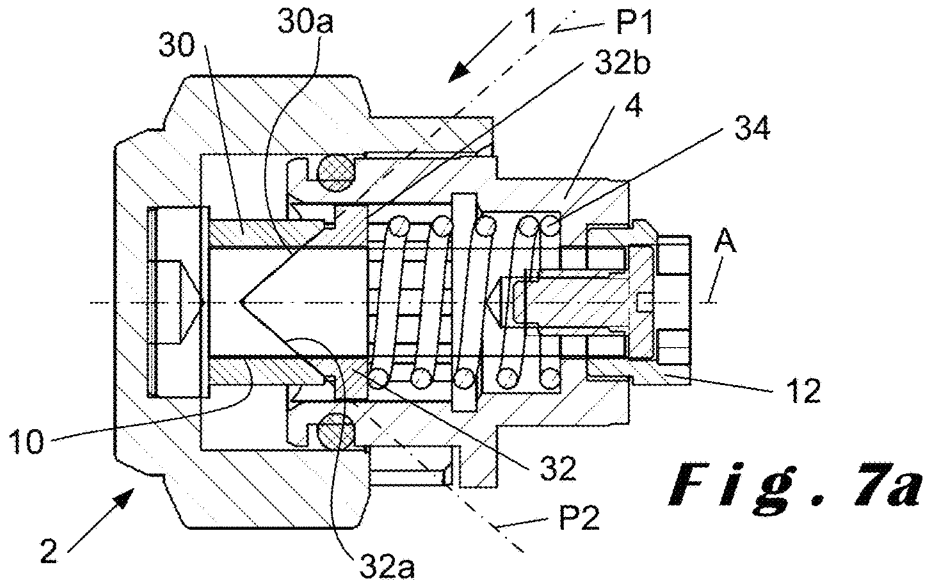
FIGS. 7*a*, 7*b* and 7*c* are sectional views showing the control member with the crown respectively in its neutral non-pressed position, in its unstable and non-pressed angular actuation position, and in its pressed position.

With reference more particularly to FIGS. 4 to 6, the first cam 30 and the second cam 32 have, at their ends facing each other, working surfaces 30*a*, 32*a*, respectively arranged to be in direct contact with one another at least when the crown 2 is in its neutral position, as shown in FIGS. 1 and 7*a*, said working surfaces 30*a*, 32*a* having a profile obtained by having at least one plane inclined on the axis A, that is to say not perpendicular to the axis A, intersect said first and second tubular cams 30, 32. Thus, by the cooperation of the working surfaces 30*a*, 32*a*, an axial rotation of the first cam 30 according to the axis A via a rotation of the crown 2 into one of the unstable actuation positions results in an axial translation of the second cam 32 in the guide tube 4, compressing the spring 34, and, by the cooperation of the working surfaces 30*a*, 32*a*, an axial translation of the second cam 32 according to the axis A returned or pushed by the spring 34, when the rotation of the crown 2 in said actuation position ceases, results in an axial rotation, in the opposite direction, of the first cam 30, and therefore of the central rod 10, which returns and automatically returns the crown 2 to its stable neutral position.

The working surfaces 30*a*, 32*a* are advantageously in direct contact with one another, preferably on the cam profile assembly when the crown 2 is in its neutral position.

Advantageously, the first cam 30 is a female cam and the second cam 32 is a male cam such that the second male cam 32 penetrates, and preferably fits, into the first female cam 30 when they are brought sufficiently close to one another, the working surface 32*a* at the end of the second male cam 32, facing the first female cam 30, then being able to come into engagement with the working surface 30*a* at the end of said first female cam 30.

The working surface 30*a* of the first female cam 30 preferably has a profile obtained by having at least one plane inclined on the axis A at an angle of preferably between |30°| and |45°| intersect said first cam 30, to be able to obtain, for example, an opening angle of the first cam of 70°+/−10°. The working surface 32*a* of the second male cam 32 preferably has a complementarily shaped profile such that the working surface 32*a* of the second male cam 32 can come into engagement with the working surface 30*a* of the first female cam 30.

According to a preferred embodiment, the working surfaces 30*a*, 32*a* of the first and second cams 30, 32 have a profile obtained by having two planes P1 and P2 inclined on the axis A and symmetrical with respect to said axis A intersect said first and second cams 30, 32, as shown in FIG. 7*a*.

Thus, the first cam 30 is preferably a female cam, the working surface 30*a* of which has a profile obtained by having two planes P1, P2 inclined on the axis A at an angle of preferably between 30° and 45° for one, here P1, and preferably of between −45° and −30° for the other, here P2, said planes P1 and P2 being symmetrical with respect to said axis A, intersect said first cam 30. The second cam 32 is a male cam, the working surface of which has a complementarily shaped profile such that the working surface 32*a* of the second male cam 32 can come into engagement with the working surface 30*a* of the first female cam 30.

The first cam 30 preferably has, at its end facing the second cam 32, a working surface 30*a*, the profile of which comprises, for example, two planes inclined on the axis A and symmetrical, providing this first cam 30 with a cylindrical shape which is notched in a V-shape. The first cam 30 has, at its opposite end to the working surface 30*a*, a circular section 30*b*, perpendicular to the axis A, which comes to rest on the base 10*a* of the central rod 10.

The second cam 32 has, at its end facing the first cam 30, a working surface 32*a*, the profile of which comprises, for example, two planes inclined on the axis A and symmetrical, providing this second cam 32 with a complementary shape to that of the first cam 30 provided by the working surface 30*a*. The second cam 32 has, at its end opposite the working surface 32*a*, a shoulder 32*b* arranged to be housed inside the guide tube 4 and to cooperate with the spring 34 provided at the back of the guide tube 4.

The second cam 32 is arranged to be slidably housed inside the guide tube 4 while being blocked in rotation there.

To this end, the inner wall of the guide tube 4 typically has longitudinal flutes 36 shown in FIG. 4 and the shoulder 32*b* of the second cam 32 has a periphery having a form which substantially complements said flutes, for example a polygonal periphery.

In the preferred embodiment in which the crown 2 also functions like a push-button, the spring 34 is also advantageously the spring which serves to return the crown 2 from its pressed position to its non-pressed position when the pressure exerted from the outside of the middle on the crown 2 ceases.

Indeed, by the cooperation of the working surfaces 30*a*, 32*a* which preferably remain in contact on the cam profile assembly, when a pressure is exerted on the crown 2, the first cam 30 moved in translation according to the axis A with the central rod 10 results in an axial translation of the second cam 32 in the guide tube 4, compressing the spring 34. By the cooperation of the working surfaces 30*a*, 32*a* which have thus remained in contact, an axial translation of the second cam 32 returned or pushed by the spring 34, when the pressure exerted from the outside on the crown 2 ceases, results in an axial translation of the first cam 30, and therefore, of the central rod 10, which returns and returns the crown 2 to its non-pressed position.

Figure 7B:
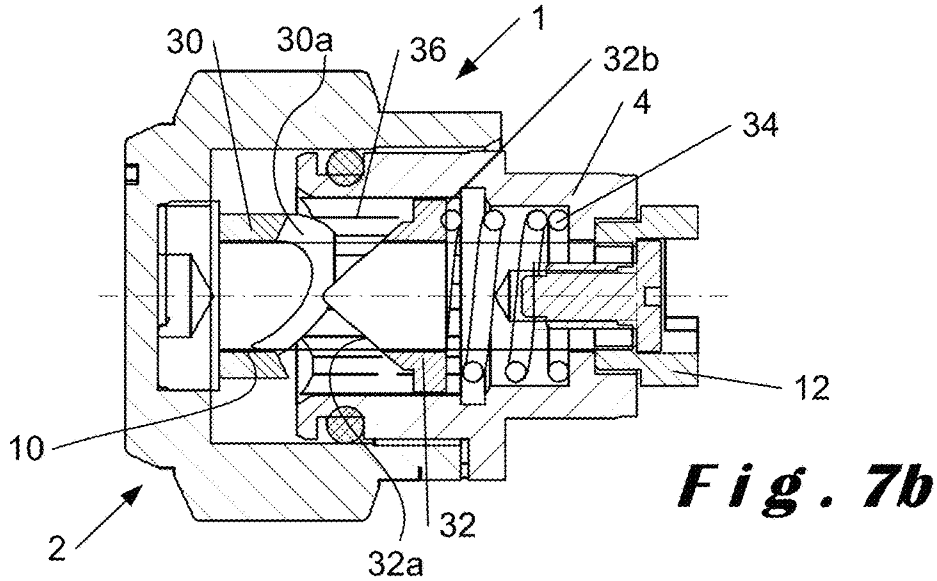
Figure 7C:
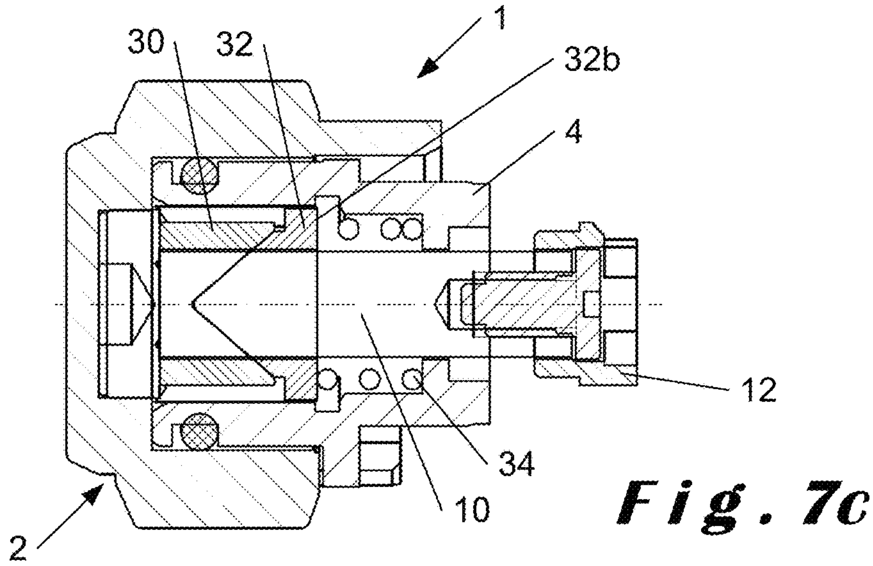

With reference to FIGS. 7*a* to 7*c*, the operation of the rotary automatic bringing-back to the stable position device integrated in the control member according to the invention is as follows:

When the crown 2 is in its non-pressed and neutral position, the first and second cams 30 and 32 are positioned on the central rod 10 fitted inside one another such that their working surfaces 30*a*, 32*a* are in direct contact with one another, typically on the cam profile assembly, as shown by FIG. 7*a*.

In this position, when the crown 2 is turned in one direction or the other, into one of its unstable angular actuation positions, through an angle of ±65° for example, to carry out a rapid correction of the month 1, for example, the axial rotation of the crown 2 results in the axial rotation of the first cam 30 rigidly connected to the central rod 10, such that the working surface 30*a* of the first cam 30 pushes the working surface 32*a* of the second cam 32 which, blocked or essentially blocked in rotation within the guide tube 4, moves away from the first cam 30 by sliding along the central rod 10 towards the back of the guide tube 4, the shoulder 32*b* of the second cam 32 compressing the spring 34 in the back of the guide tube 4, as shown in FIG. 7*b*.

In parallel, the central rod 10, actuated in rotation by the crown 2, has rotated the control rod 3 via the squares 12 and 14, so as to carry out the rapid correction requested in one direction or the other according to the direction of rotation of the crown 2.

When the rapid correction is completed and the user has released the crown 2, the torque transmitted to the central rod 10 in order to rotate it into the unstable actuation position ceases. The second cam 32, no longer being constrained by the first cam 30, is returned by the spring 34 by sliding along the central rod 10 towards the first cam 30. Thus, the working surface 32*a* of the second cam 32, in engagement with the working surface 30*a* of the first cam 30, rotates the latter in the opposite direction, and therefore the central rod 10, until the first and second cams 30, 32 fit again. The rotation of the central rod 10 in the opposite direction has returned the crown 2 to its neutral position, as shown in FIG. 7*a*.

In the preferred embodiment in which the crown 2 also functions like a push-button, when the crown 2 is in its stable angular position, as shown in FIG. 7*a*, it is possible to actuate a second function, for example the zero-resetting of a chronograph mechanism by pressing the crown 2.

During its axial movement following a pressure on the crown 2, the central rod 10 moves with it, in axial translation, the first cam 30 which, while remaining fitted with the second cam 32 blocked or essentially blocked in rotation within the guide tube 4, pushes it by essentially or, indeed solely making it slide within the guide tube 4, the shoulder 32*b* of the second cam 32 compressing the spring 34 in the back of the guide tube 4, as shown in FIG. 7*c*.

In parallel, the central rod 10 in axial translation has moved the control rod 3, also in axial translation, via the squares 12 and 14, so as to actuate the second function, for example the chronograph zero-resetting. After releasing the pressure on the crown 2, and therefore on the central rod 10, the second cam 32 pushed by the spring 34 slides within the guide tube towards the outside while, itself, pushing on the first cam 30, and therefore on the central rod 10, such that the central rod 10 and the crown 2 resume the non-pressed position shown in FIG. 7*a*.

The timepiece can comprise one or more control members of the invention, arranged to actuate different first and second functions, in particular functions of several complications.

The invention makes it possible to control at least one function of a timepiece movement by rotating a control member like a rapid control rod, guaranteeing an automatic bringing back to the neutral position, once the function is actuated.

Furthermore, the invention also advantageously makes it possible to control two different functions, in particular functions of different complications, independent of one another, by means of a single control member, one of the functions being controlled by said control member like a push-button and the other of the functions being controlled by said control member like a rapid control rod, the automatic bringing back to the neutral position, once the function is actuated, being reliable and therefore guaranteed.

The single control member combining rotation control and pressure control is a preferred embodiment of the invention, but it is obvious that the control member of the invention can only be used with rotation control, without the push-button function.

The invention claimed is:

1. A control member configured to control at least one first function of a timepiece movement, said control member comprising:
- a crown comprising:
  - a head; and
  - a central rod rigidly connected to the head;
- a control rod configured to be rigidly connected to the central rod;
- a guide tube, having a longitudinal axis A, in which said central rod is mounted such that the central rod can at least rotate axially according to said longitudinal axis A; and
- a spring arranged inside the guide tube;
- the crown being arranged to occupy at least one non-pressed position in which said crown can rotate axially in at least a first direction between at least one stable neutral angular position and at least one unstable angular actuation position in which said at least one first function can be actuated via the control rod;
- wherein the control member further comprises:
- an automatic bringing-back device configured to automatically bring the crown from the at least one unstable angular actuation position back to the at least one stable neutral angular position, the automatic bringing-back device comprising:
  - a first tubular cam mounted around the central rod such that the first tubular cam is rigidly connected thereto, and
  - a second tubular cam housed inside the guide tube, mounted such that the second tubular cam can freely translate axially on the central rod and arranged so as to be able to essentially slide axially within the guide tube and to cooperate with the spring provided in said guide tube, wherein said first tubular cam and said second tubular cam have working surfaces arranged to be in contact with one another at least when the crown is in the at least one stable neutral angular position, said working surfaces having a profile obtained by having at least one plane inclined on the longitudinal axis A intersect said first and second tubular cams such that, by cooperation of the working surfaces, an axial rotation of the first tubular cam via a rotation of the crown into the unstable angular actuation position results in an axial translation of the second tubular cam, compressing the spring, and such that, by the cooperation of the working surfaces, an axial translation of the second tubular cam returned by the spring, when the rotation into the unstable angular actuation position ceases, results in an axial rotation of the first tubular cam, which automatically returns the crown to the at least one stable neutral angular position.

2. The control member according to claim 1, wherein the first tubular cam is a female cam, the working surface of the first tubular cam having a profile defined by having at least one plane inclined on the longitudinal axis A at an angle of between |30°| and |45°| intersect said first tubular cam, the second tubular cam being a male cam, the working surface of second tubular cam having a complementarily shaped profile.

3. The control member according to claim 2, wherein the working surfaces of the first and second tubular cams have a profile defined by having two planes inclined on the longitudinal axis A and symmetrical with respect to said longitudinal axis A intersect said first and second tubular cams.

4. The control member according to claim 3, wherein the first tubular cam is a female cam, the working surface of the first tubular cam having a profile obtained by two planes inclined on the axis A at an angle of between −45° and −30° for one and of between 30° and 45° for the other, symmetrical with respect to said axis A, intersect said first tubular cam, the second tubular cam being a male cam, the working surface of the second tubular cam having a complementarily shaped profile.

5. The control member according to claim 2, wherein an inner wall of the guide tube has longitudinal flutes and wherein the second tubular cam comprises a shoulder housed inside the guide tube and arranged to cooperate with the spring provided at a back of the guide tube, said shoulder having a periphery with a form which substantially complements said longitudinal flutes.

6. The control member according to claim 1, wherein the working surfaces of the first and second tubular cams have a profile defined by having two planes inclined on the longitudinal axis A and symmetrical with respect to said longitudinal axis A intersect said first and second tubular cams.

7. The control member according to claim 6, wherein the first tubular cam is a female cam, the working surface of the first tubular cam having a profile obtained by two planes inclined on the axis A at an angle of between −45° and −30° for one and of between 30° and 45° for the other, symmetrical with respect to said axis A, intersect said first tubular cam, the second tubular cam being a male cam, the working surface of the second tubular cam having a complementarily shaped profile.

8. The control member according to claim 6, wherein an inner wall of the guide tube has longitudinal flutes and wherein the second tubular cam comprises a shoulder housed inside the guide tube and arranged to cooperate with the spring provided at a back of the guide tube, said shoulder having a periphery with a form which substantially complements said longitudinal flutes.

9. The control member according to claim 7, wherein an inner wall of the guide tube has longitudinal flutes and wherein the second tubular cam comprises a shoulder housed inside the guide tube and arranged to cooperate with the spring provided at a back of the guide tube, said shoulder having a periphery with a form which substantially complements said longitudinal flutes.

10. The control member according to claim 1, wherein an inner wall of the guide tube has longitudinal flutes and wherein the second tubular cam comprises a shoulder housed inside the guide tube and arranged to cooperate with the spring provided at a back of the guide tube, said shoulder having a periphery with a form which substantially complements said longitudinal flutes.

11. The control member according to claim 1, wherein the first function is a correction function of a mechanism and wherein the at least one unstable angular actuation position corresponds to a correction position of the mechanism.

12. The control member according to claim 1, wherein the crown is arranged such that the crown can rotate axially in the first direction between the at least one stable neutral angular position and a first of the at least one unstable angular actuation position, and such that the crown can rotate axially in an opposite second direction between said at least one neutral angular position and a second of the at least one unstable angular actuation position.

13. The control member according to claim 12, wherein the first function is a correction function of a mechanism and wherein the first unstable angular actuation position corresponds to a first correction position of the mechanism, the second unstable angular actuation position corresponding to a second correction position of the mechanism.

14. The control member according to claim 1, wherein the central rod is mounted such that the central rod can translate axially in the guide tube, the crown also being arranged, in response to a pressure on said crown, such that the crown can translate axially between the crown's non-pressed position and a pressed position in which a second function, which is distinct from the first function, can be actuated via the control rod, such that, by the cooperation of the working surfaces, an axial translation of the first tubular cam results in an axial translation of the second tubular cam, compressing the spring, and to resume the crown's non-pressed position when the pressure on the crown ceases, by the cooperation of the working surfaces, an axial translation of the second tubular cam returned by the spring resulting in an axial translation of the first tubular cam which returns the crown to the crown's non-pressed position.

15. The control member according to claim 14, wherein the second function is a chronograph function.

16. A timepiece comprising at least one said control member according to claim 14, further comprising a month indicating mechanism and a chronograph mechanism and wherein the first function is a correction function for the month, the second function being one of the chronograph functions.

17. The control member according to claim 1, wherein the central rod has at a free end thereof a female driving square configured to fit a male square provided at the end of the control rod.

18. A timepiece comprising at least one control member according to claim 1.

19. The timepiece according to claim 18, further comprising a month indicating mechanism or a chronograph mechanism, wherein the first function is a correction function for the month, or respectively at least one function of the chronograph.

20. The timepiece according to claim 19, wherein the second function is a Zero-Resetting or Flyback function of the chronograph.

* * * * *